United States Patent [19]
Risley et al.

[11] Patent Number: 5,311,979
[45] Date of Patent: May 17, 1994

[54] VACUUM COMBINER

[75] Inventors: Robert F. Risley, Ellicott City; Paul E. Barkley, Sykesville; Gordon S. Lawless, Finksburg, all of Md.

[73] Assignee: Ambec, Owings Mills, Md.

[21] Appl. No.: 10,770

[22] Filed: Jan. 29, 1993

[51] Int. Cl.⁵ .............................. B65G 47/12
[52] U.S. Cl. ........................ 198/453; 198/454; 198/493; 198/836.1; 198/689.1
[58] Field of Search .......... 198/453, 454, 493, 836.1, 198/836.3, 689.1

[56] References Cited

U.S. PATENT DOCUMENTS

| | | | |
|---|---|---|---|
| 2,800,226 | 7/1957 | Drennan | 209/111 |
| 2,827,998 | 3/1958 | Breeback | 198/31 |
| 2,860,761 | 11/1958 | Kocan et al. | 198/26 |
| 3,352,404 | 11/1967 | Di Settembrini | 198/689.1 |
| 3,934,706 | 1/1976 | Tice | 198/32 |
| 4,236,625 | 12/1980 | Smith et al. | 198/454 |
| 4,284,370 | 8/1981 | Danler et al. | 406/86 |
| 4,479,574 | 10/1984 | Julius et al. | 198/836.1 |
| 4,522,295 | 6/1985 | Seragnoli | 198/493 |
| 4,620,826 | 11/1986 | Rubio et al. | 414/73 |
| 4,669,604 | 6/1987 | Lenhart | 198/453 |
| 4,744,702 | 5/1988 | Wiseman et al. | 406/88 |
| 4,768,643 | 9/1988 | Lenhart | 198/453 |
| 4,822,214 | 4/1989 | Aidlin et al. | 406/86 |
| 4,962,843 | 10/1990 | Ouellette | 198/453 |
| 4,976,343 | 12/1990 | Fuller | 198/453 |
| 5,009,550 | 4/1991 | Hilbish et al. | 406/87 |
| 5,017,052 | 5/1991 | Bartylla | 406/88 |
| 5,028,174 | 7/1991 | Karass | 406/88 |
| 5,037,244 | 8/1991 | Newton | 406/86 |
| 5,037,245 | 8/1991 | Smith | 406/88 |
| 5,042,639 | 8/1991 | Guinn et al. | 198/454 |
| 5,065,858 | 11/1991 | Akam et al. | 198/493 |
| 5,129,504 | 7/1992 | Smith | 198/453 |
| 5,160,014 | 11/1992 | Khalar | 198/453 |

Primary Examiner—Joseph E. Valenza
Attorney, Agent, or Firm—Hopkins & Thomas

[57] ABSTRACT

The invention provides a transport apparatus, or combiner, for transporting light-weight containers at high speed rates. The combiner includes one or more conveyor belt-type surfaces that have openings thereupon, a guide rail assembly, and a vacuum source that adds a "drag" or "weighting" force on the light-weight containers. The conveyor belt-type surfaces may or may not be moving at the same velocity. The guide rail assembly is comprised of rods and rollers, wherein the rollers are aligned in a unique anti-jamming staggered or diamond pattern. The guide rail assembly can be positioned such that it is substantially upright, or the guide rail assembly can be positioned such that it is sloped over the conveyor surfaces. The rods within the guide rail assembly may be substantially vertical, or they may be pitched forward. One vacuum source may be used for the plurality of conveyor surfaces, or one vacuum source may be used for each individual conveyor. The vacuum force should be such that it is greatest on the discharge conveyor surface and lowest on the infeed conveyor surface. In an alternative embodiment, the guide rail assembly includes an air-jet means that also helps propel the light-weight containers downstream.

15 Claims, 6 Drawing Sheets

VACUUM COMBINER

FIELD OF THE INVENTION

This invention is drawn to a means and method for the high speed conveyance of light-weight containers such as cans and plastic bottles oriented in an upright attitude on a surface conveyor system. In particular, the invention relates to a surface conveyor combiner that rapidly merges light-weight containers from an upstream width of at least three containers abreast to a downstream width of one container so that the containers move in single file toward a subsequent processing station.

BACKGROUND OF THE INVENTION

Industries that package their items in can or bottle-type containers usually are searching for ways to maximize production output. With the ever-increasing demand for higher production rates, surface conveyor systems have been designed that are capable of greater accumulation of the containers so that the surface conveyor can accommodate a varying backlog of the containers. For example, the infeed of the conveyor system might be several times wider than the containers so as to be able to receive the containers in random multiple width arrangement of containers. Usually, the wider the infeed conveyor is, the greater its accumulation capability will be. Hence, several container-dependent industries are now using very wide conveyor systems.

Although wider conveyor systems have helped to increase production rates, production has still heretofore been limited because the typical production line requires that containers be fed into a subsequent work station in a single file. For example, standard equipment such as inspection lights and/or electronic bottle inspectors, product fillers, container cappers or sealers, container de-cappers, and labelers all require that the container must enter in a single file. In order to narrow the container stream width from an initial multiple width of containers to single file, combiners have been developed. The smooth transfer from a wide width to single file makes the combiner one of today's most important items in the production line.

In the past, multiple flat top chains and converging rails have been used in order to combine containers from a mass of containers into a single file or row of containers. When combining light-weight containers there is a problem that the side-to-side compaction of the containers against one another causes some of the containers to levitate and lose speed because they no longer touch the conveyor chain. This side-to-side compaction also creates a problem of bridging of the containers between the side guides of the combiner so that the movement of the containers stalls, and the following containers push the containers next ahead, which tends to cause more bridging between the side rails instead of pulling the containers in spaced relationship into single file.

Also in the past, it was generally believed in the industry that glass bottle combiners must be designed to satisfy the following conditions: (1) the combiner must be at least two meters long; (2) the downstream end of the combiner must be located at least two meters upstream from the equipment it feeds; (3) the combiner must use tapered guide rails; (4) the combiner should use two chains—a 7½ inch width feed chain and a 3¼ inch width single conveyor discharge chain; (5) the relation of the infeed chain speed to the discharge chain speed must be 66%; and (6) the combiner must always be full of bottles to maintain the bottle position that produces smooth flow. A combiner made within these six specifications typically would yield an output of 600 to 1000 bottles; 1500 cans per minute; and no more than 600 bpm for standard 12 oz. plastic bottles. Twelve ounce plastic bottles are limited to 600 bpm because of their light bottle weight, low bottle stability, high bottle compressibility and high friction that exists between the plastic bottle and the guide rails.

If the above six combiner specifications are used with an air-jet guide rail to combine light-weight containers such as 12 oz. plastic bottles, 650 bpm has been achieved. However, heretofore no one has been able to successfully combine light-weight containers at greater than 700 bpm.

For metal type containers, such as cans, Lenhart, U.S. Pat. No. 4,669,604, teaches that if objects are first arranged in an equilateral triangle on a dead plate, the objects, such as metal cans, may be formed in a single file using a vacuum source drawn through openings in the conveyor belt to hold the outside row of containers in place on the moving belt and out of engagement with the side rails while the other containers are urged in between the containers in the outside row. However, Lenhart's invention will not work properly if the containers are in a "random, helter-skelter fashion" and also requires that the cans must be pushed off the dead plate by the oncoming moving mass of cans upstream of the dead plate.

SUMMARY OF THE INVENTION

The invention is a means and method for rapidly combining light-weight containers from an upstream width of three or more containers abreast to a downstream, "combined" single container width. The combiner incorporates the use of a plurality of parallel conveyors, preferably three or more, each having at least 15% of its surface area open. Each conveyor in sequence is operated at a greater velocity than the previous conveyor and is in communication with a vacuum source that is positioned below the conveyor surfaces such that the vacuum source pulls air through the open areas in the conveyor surfaces. The amount of vacuum, or drag force, on each conveyor surface is not necessarily the same. In fact, in a preferred embodiment, the vacuum is greatest at the faster moving discharge conveyor surface and lowest at the slower moving infeed conveyor surface. The velocity of each individual container on each conveyor is determined by the velocity of each conveyor surface and by the amount of vacuum applied to each conveyor surface.

The present invention is ideally suited to convey light-weight containers that weigh less than or equal to six ounces. In the past, a problem with light-weight containers was that they had a tendency to levitate and lose contact with the conveyor surface when they were conveyed at high speeds. When light-weight containers lose contact with the conveyor surfaces, the conveyor surfaces lose control of the movement of the containers and the containers may engage the following containers and become wedged or "bridged" against the side guides.

The present invention compensates for this problem by inducing an air flow downwardly through the openings of the conveyor belts that develops enough drag or negative air pressure beneath the containers so that the atmosphere pushes downwardly on the light-weight containers to effectively add more weight to the light-weight containers and thereby increase the friction between the bottoms of the containers and the conveyor belts, which effectively increases the velocity at which the containers may be combined. It should therefore be appreciated that light-weight containers having a weight of six ounces, can be rapidly combined by the present invention at speeds heretofore not achieved.

It is therefore an object of the present invention to provide a vacuum combiner that rapidly combines light-weight containers, such as plastic bottles, from a mass of three or more rows of containers on a surface conveyor system into a single row.

It is an additional object of the present invention to provide a vacuum combiner that avoids the need for an upstream pushing force that pushes the containers downstream.

Another object of the invention is to provide a vacuum combiner with a guide rail that applies a minimum amount of surface friction to the containers as the containers are combined into a single row. In one alternative embodiment, the guide rails can be sloped inwardly from the vertical axis over the path of the containers to engage the upper surface of the container to inhibit any upward vibrations and levitation of the containers. In a second alternative embodiment, the rods in the guide rails should be angled such that the bottom end of the rod trails, or is upstream of, the top end of the rod at an angle of from three (3) to thirteen (13) degrees.

It is also an object of the present invention to provide a vacuum combiner comprised of three or more conveyor sections, and a vacuum source that provides a vacuum force on each conveyor section, such that the vacuum strength on the conveyor section at discharge is greatest, and the vacuum strength on the conveyor section at the infeed is lowest; such arrangement providing a downstream pulling force on the light-weight containers.

It is also an object of the present invention to provide a vacuum combiner comprised of three or more conveyor sections, with each conveyor section having its own vacuum source, such that the vacuum strength on the conveyor section at discharge is greatest, and the vacuum strength on the conveyor section at the infeed is lowest; such arrangement providing a progressively increasing friction force applied by the light-weight containers against the conveyor sections.

It is a further object of the present invention to provide a vacuum combiner comprising a plurality of individual conveyor chains having surfaces that operate at velocities different from the other conveyor chain surfaces.

Other objects, features and advantages of the present invention will become apparent from the following description, when read in conjunction with the accompanying drawings.

DETAILED DESCRIPTION OF THE INVENTION

Referring now in detail to the drawings in which like numbers refer to the same structure throughout the figures, the preferred embodiment of the vacuum combiner of the present invention is generally referred to as reference number 10. Light-weight containers 28 are fed into vacuum combiner 10 by standard conveyor 15 which conveys light-weight containers 28 to infeed conveyor 20. Infeed conveyor 20 is a Rexnord LF 4706 table-top chain conveyor manufactured by Rexnord of Grafton, Wis., U.S.A. that comprises a plurality of hinges 26. Infeed conveyor 20 has a 1½" pitch from hinge to hinge and it is six inches wide. Infeed conveyor 20 is powered by infeed conveyor motor 40 which is a Eurodrive Varimot variable motor manufactured by Eurodrive of Bridgeport, N.J., U.S.A. Each hinge 26 has air flow openings 27. As a plurality, hinges 26 comprise infeed conveyor surface 30.

Intermediate conveyor 22 is positioned parallel to infeed conveyor 20 such that a gap of less than 3/16" exists between the two conveyors. Intermediate conveyor 22 is connected to infeed conveyor 20 by side guides (not shown). Intermediate conveyor 22 is also a Rexnord LF 4706 table top chain conveyor that comprises a plurality of hinges 36. Intermediate conveyor 22 is also empowered by intermediate conveyor motor 42 which is a Eurodrive Varimot motor. Each hinge 36 has air flow openings 38. As a plurality, hinges 36 comprise intermediate conveyor surface 32.

Discharge conveyor 24 (FIG. 2A) is positioned parallel to intermediate conveyor 22 such that a gap of less than 3/16" exists between the two conveyors. Discharge conveyor 24 is connected to intermediate conveyor 22 by side guides (not shown). Discharge conveyor 24 is also a Rexnord LF 4706 table top chain conveyor that is three inches wide and comprises hinges 46. Discharge conveyor 24 is empowered by discharge conveyor motor 44 which is also a Eurodrive Varimot variable motor. Each hinge 46 has air flow openings 48. As a plurality, hinges 38 comprise discharge conveyor surface 34.

Figure 4:
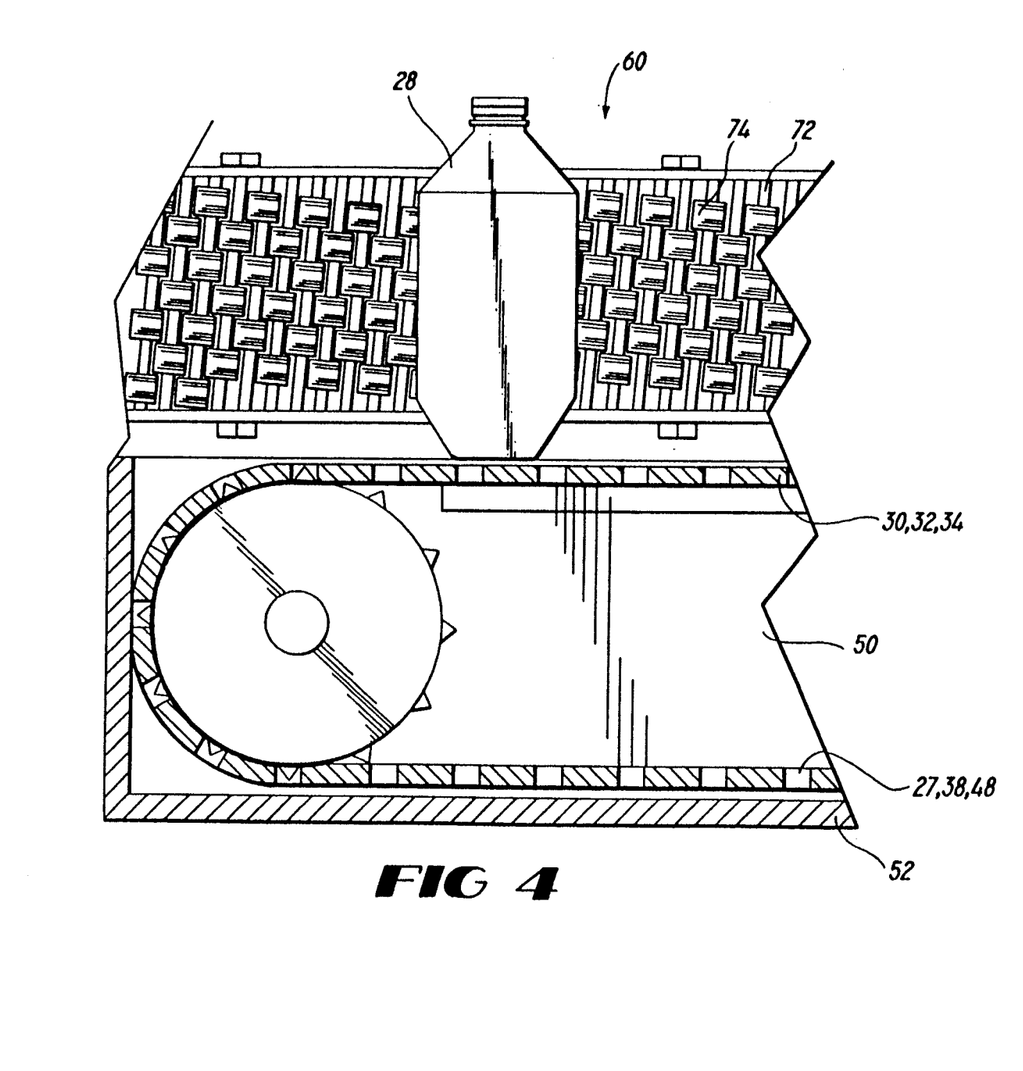
FIG. 4 is a partial side elevational view of the air plenum, a conveyor chain, a guide rail and a container moving through the system.

Connected to and above conveyor surfaces 30, 32 and 34 are rail assemblies 60 and 62. Rail assemblies 60 and 62 are identical, except that one assembly is right-sided and the other is left-sided; therefore, only rail assembly 60 will be described in detail. Rail assembly 60 includes a C-shaped rail housing 64 which has a housing top 66, housing bottom 68 (not shown), housing side 70, and housing ends 71a and 71b (not shown). The underside of housing top 66 and the inside of housing bottom 68 contain a plurality of corresponding apertures (not shown). Rail assembly 60 also includes a plurality of rollers 74 and a plurality of roller rods or axles 72 (FIG. 4). Rollers 74 have a concentric hole (not shown), such that they may be mounted upon, and rotated about, roller rods 72. After a number, usually three to five, rollers 74 have been mounted onto a roller rod 72, the ends of roller rod 72 should be pressed into a pair of corresponding holes that are in housing bottom 68 and housing top 66. Each roller rod 72 which has mounted thereon rollers 74 should be preferably pressed into rail housing 64 such that rollers 74 will have the staggered or diamond pattern such as that shown in FIG. 4. Roller rod 72 may be mounted into rail housing 64 at a ninety (90) degree angle from the horizontal axis, or, roller rod 72 may be mounted into rail housing 64 such that the bottom end of roller rod 72 trails, or is upstream, of the top end of roller rod 72 at an angle of from three (3) to thirteen (13) degrees. By angling the top ends of roller rod 72 within the rail housing, the rollers 74 direct the light-weight containers 78 both downstream and downward towards a particular conveyor surface.

In addition, as assembled, it is preferable to angle rail assemblies 60 and 62 toward one another and the conveyor surfaces such that up to a forty (40) degree angle from the vertical axis is achieved. By angling rails 60 and 62 downward, the guide rails will help prevent the containers 78 from levitating off of a particular conveyor surface.

The angle of rail housing 60 and 62 is maintained by a plurality of bracket assemblies 76, which also mount rail assemblies 60 and 62 to plenum 50, and allow the distance between the rail assemblies 60 and 62, which defines the width of container flow-path 80, to be adjustable. Each bracket assembly 76 has a L-shaped support 82 that is connected to rail housing side 70 by bolt 84. The horizontal portion of support 82 has a slot 86 through which bolt 88 may pass. Bolt 88 connects first support 82 to support 90 which has slot 92 and a bolt hole (not shown). Bolt 96 passes through the support bolt hole and connects support 90 to a second L-shaped support 98. Second support 98 has a slot 100 and holes 102 and 104 through which bolts 106 and 108 attach side support 98 to plenum side 54. It should be appreciated that the width of the container flow-path 80 may be adjusted by moving bolts 88 and 96 relative to slots 86, 92, and 100.

Figure 1:
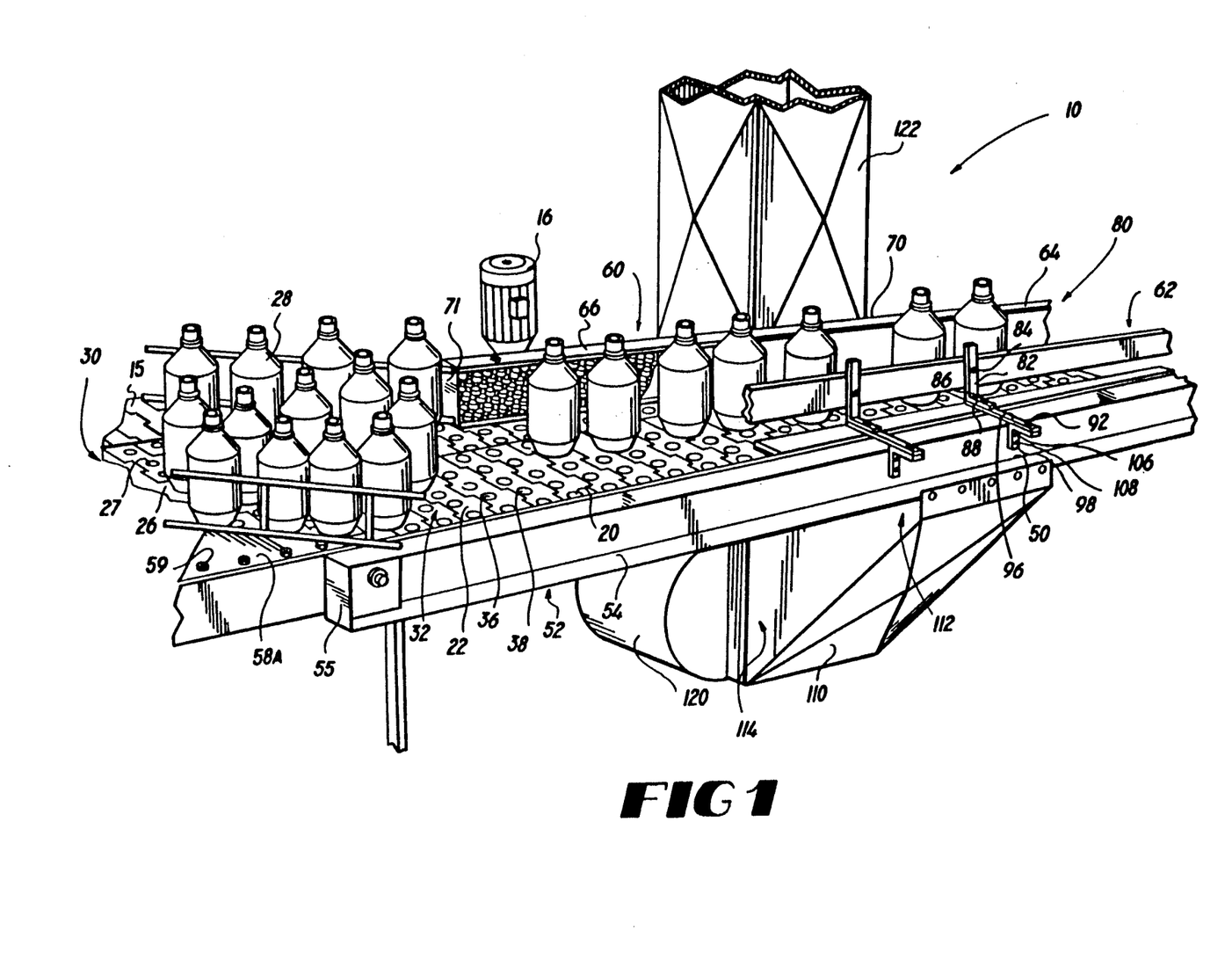
FIG. 1 is a perspective illustration of the combiner.
Figure 2A:
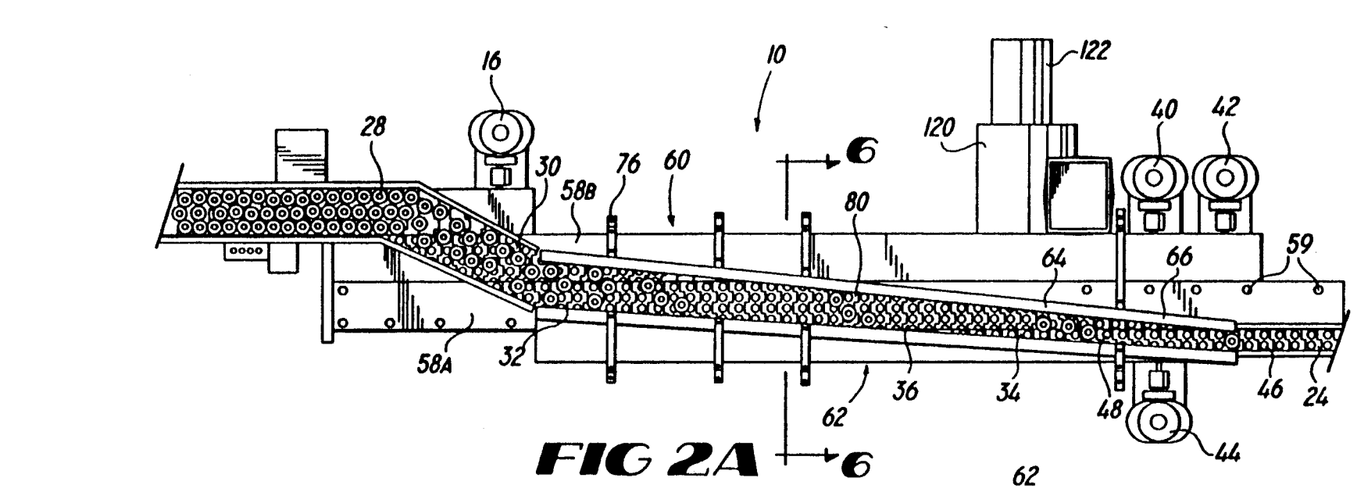
FIG. 2A is a plan view of the combiner.
Figure 2B:
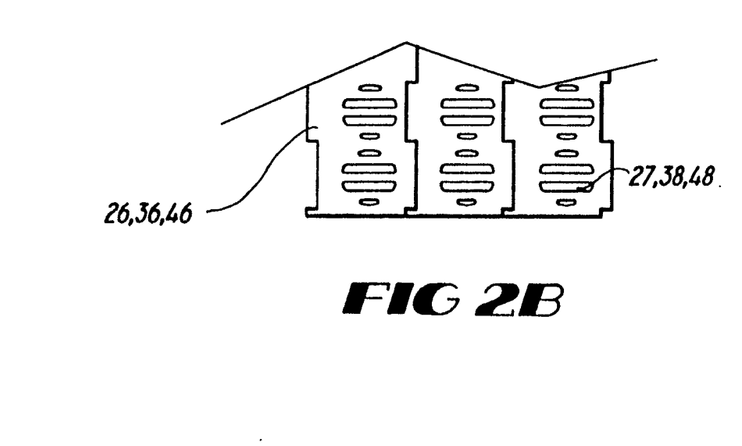
FIG. 2B is a detail plan view of a conveyor chain surface of the combiner.
Figure 2C:
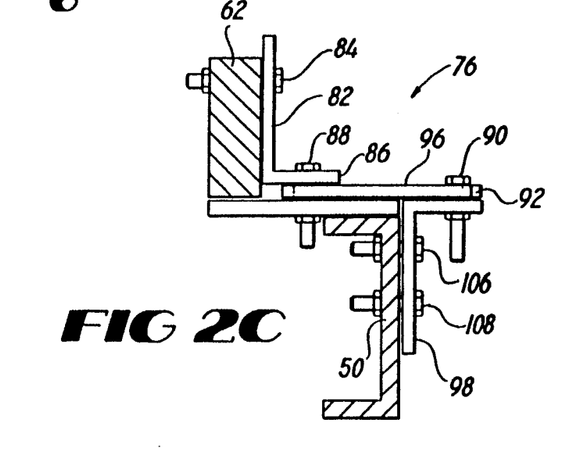
FIG. 2C is a partial end view of a bracket assembly.
Figure 3:
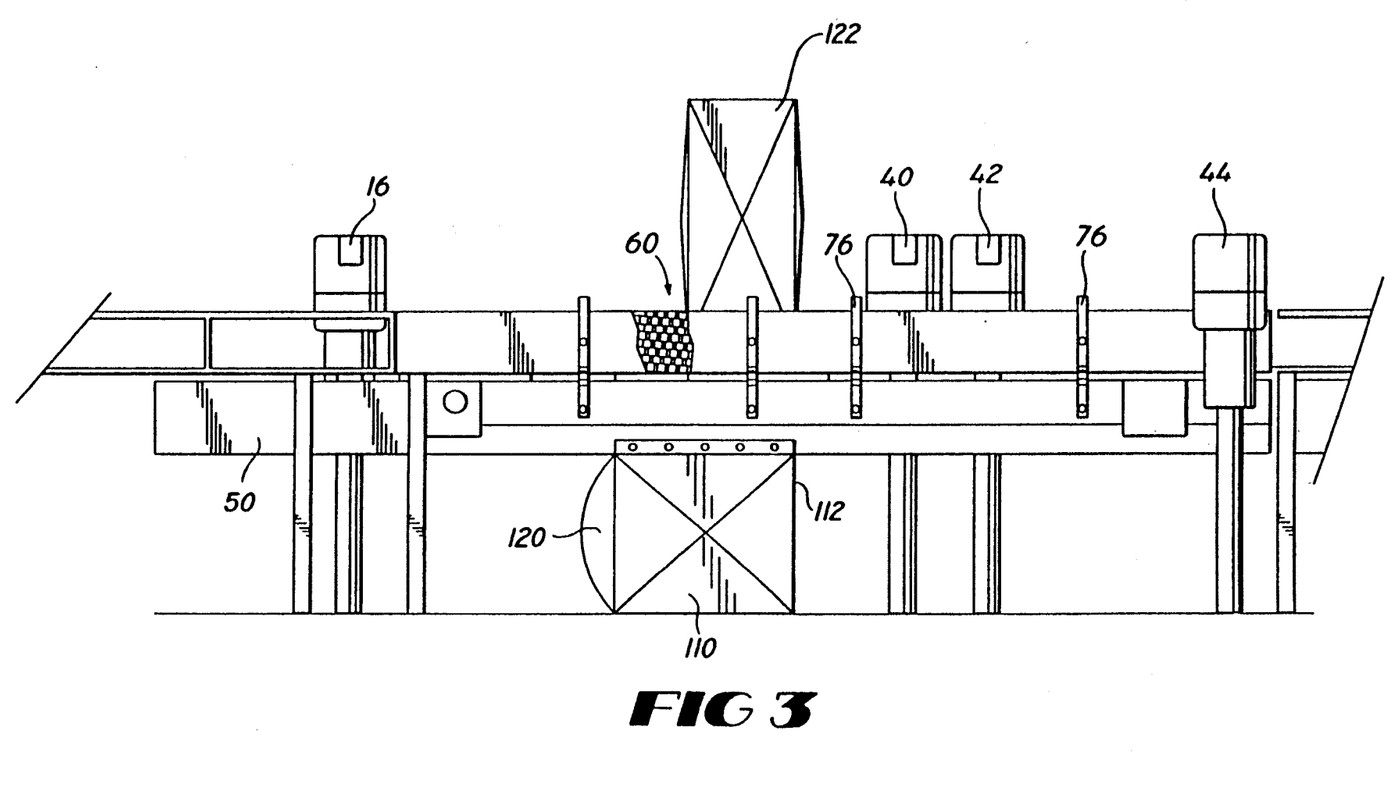
FIG. 3 is a side elevational view of the combiner with a portion cut away to show the side rail.

As stated, second support 98 is attached to plenum sides 54 and 56 (not shown). Plenum sides 54 and 56, together with plenum bottom 52, plenum top portions 58a and 58b, and plenum ends 55 and 57 comprise plenum 50. Plenum 50 is generally a closed rectangular-shaped box. The top of plenum 50 is in part defined by conveyor surfaces 30, 32, and 34; and in part by plenum top portions 58a and 58b as shown in FIG. 2A. Top portions 58a and 58b are reciprocally aligned about the container flow-path 80 that is defined by rail assemblies 60 and 62. Plenum tops 58a and 58b are connected to plenum ends 55 and 57 by bolts 59. Plenum top portions 58a and 58b may also be held in place by the generated vacuum pressure. In an alternative embodiment, plenum top portions 58a and 58b may be bearing plates or strips that are positioned below the conveyor surfaces and connected to the sides of the plenum.

Plenum ends 55 and 57 must be constructed such that they will surround and at least partially encompass conveyors 20, 22, and 24. In particular, end 57, which allows discharge conveyor 24 to pass therethrough, must be fit as snugly as possible to minimize air loss.

Plenum bottom 52 has a section removed therefrom such that duct member 110 may be attached thereto to allow air to flow through plenum bottom 52 and into duct member 110. Duct member 110 is bolted to plenum side walls 54 and 56.

In addition to a plenum end 112, duct member 110 also has a vacuum source end 114. Vacuum source end 114 is attached to vacuum source 120. Vacuum source 120 is a Dayton Blower Model number 7H171 that is able to pull air through air flow openings 27, 38, and 48 and into plenum 50; through plenum bottom 52 and into duct member 110; through duct member 110 and into vacuum source 120. Vacuum source 120 then expels the air into discharge duct 122.

In alternative embodiments, the surface conveyor belts of the present invention may be any standard oval shaped, table-top chain conveyor. The width of the conveyor surfaces may range from three inches to one foot. At least 15% of the conveyor surfaces must be open.

Each individual conveyor should be powered by a standard variable motor. Although the motors are variable, it is preferable to fix the motors to run at a predetermined speed. All of the motors may be set such that each conveyor surface will be moving at approximately 300 feet per minute(fpm), or roughly 3.4 mph. However, the motors may be set such that the discharge conveyor surface is running fastest at approximately 600 fpm, and the infeed conveyor slowest at approximately 50 fpm.

When the conveyors are aligned parallel to one another by the side guides that are on the sides of the conveyor assembly, it is preferable to have no more than a ⅛ inch gap between adjacent parallel conveyors.

The entire length of the vacuum combiner may be as short as six feet, and because the downstream end, or discharge end of the combiner, may be placed in direct contact with a single-file dependent machine, the present invention greatly reduces the amount of space that is required to combine the containers and cooperate the combiner to the next work station.

Alternate guide rails should be adjustable such that the width of the container flow-path may be varied and that light-weight containers of varying widths may be combined. The guide rails must be positioned over the conveyor surfaces such that a pair of converging guide rails define the container flow-path which is progressively narrowed to a container's single file width. Although the infeed width of the guide rails is not essential, the guide rails should be tapered from its infeed width to its discharge single file width at an angle of from 1 degree to 5 degrees, preferably 3 degrees, for a standard 12 oz. plastic bottle.

Alternative guide rails should comprise an assembly of several mini-rollers mounted on a plurality of vertical rods that are supported in a housing. It should be appreciated that guide rails formed of a staggered pattern of intersecting freely rotatable rollers will provide an almost frictionless guide that provides a smooth, relatively vibration-free guiding and merging of the containers, as opposed to a guide means with larger or unstaggered rollers.

Each individual mini-roller is preferably made of a low-friction acetal plastic. The preferable mini-roller is cylindrical, has a 7/16 inch diameter, and is ¼ inch thick. Such a mini-roller may be purchased as "Delrin" from DuPont.

The preferred rod is a 5/32 inch diameter steel rod. The assembled rods that support the rollers are mounted at their ends into holes formed in the sheet metal housing, in the top and bottom walls of the housing. Preferably, each guide rod should be angled with the bottom end of the rod trailing the top end of the rod at an angle of from five(5) to ten(10) degrees from the vertical axis such that the rollers mounted on the rod will force the containers being conveyed down toward the conveyor's surface. In addition, each guide rail can be angled inward and downward over the conveyor surfaces at an angle of from zero (0) to forty (40) degrees from the vertical axis such that it will also force the containers being conveyed down toward the conveyor's surface.

Figure 5:
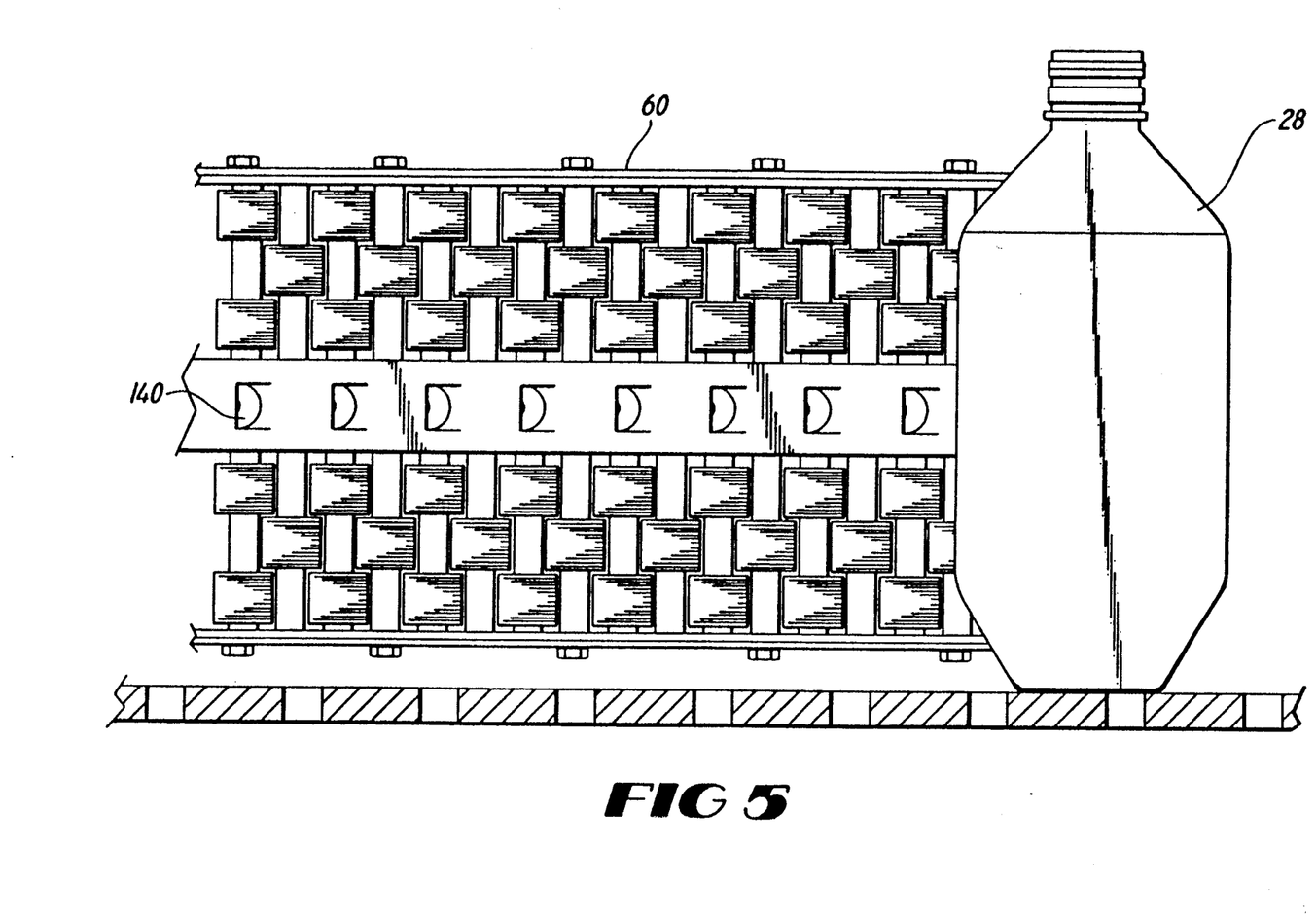
FIG. 5 is a side view of a guide rail with air jets.
Figure 6:
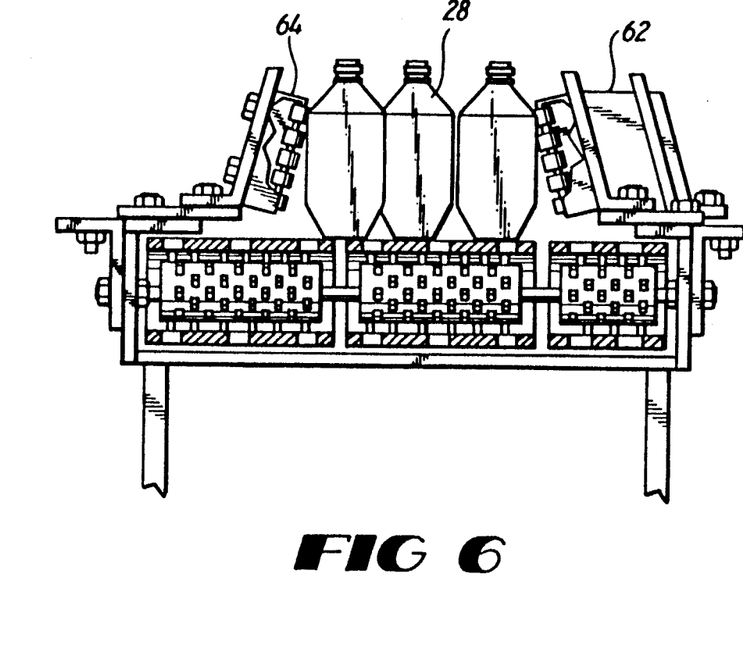
FIG. 6 is an end view taken along ling 6—6 of FIG. 2A.

In an additional embodiment of the present invention, an air jet guide system comprised of individual air jets 140 may also be incorporated into the guide rail. Streams of air are directed from the guide rails' air jets 140 across the conveyor path to gently urge the containers into a single file of containers. See FIG. 5.

The vacuum combiner of the present invention may also incorporate the use of one or more vacuum sources to draw air through the openings in the conveyor chains. One vacuum source may provide sufficient vacuum force for all of the conveyors. However, in an alternate embodiment, there is an independent vacuum source for each conveyor.

Each vacuum source is preferably a blower that runs at a constant speed and the inlet of the blower communicates with a duct and plenum which applies the low pressure to the lower surface of the flight of the conveyor chain which moves the containers. As a result, air is pulled through the conveyor surface by the blower and blown out through a discharge duct.

The suction or vacuum force is only applied to the part of the conveyor surface that is between the guide rails, which is defined as the container flow-path. For those portions of the conveyor that are not in the container flow-path, the conveyor surface should be covered to prevent depletion of the vacuum force. Generally, the amount of vacuum applied to the particular conveyor surface is varied by controlling the speed of the blower, the constriction of the conduit extending between the blower and the conveyor, and by varying the amount of surface area open to the vacuum source on a particular conveyor.

In a preferred embodiment, the amount of vacuum force applied to the infeed conveyor of the combiner is less than the vacuum applied to the subsequent conveyors, usually at a suction force that approximately doubles the effective weight of the container. The next parallel conveyor in the container flow-path is greater than the infeed vacuum, or approximately two to five times the container weight. The discharge conveyor should have the greatest vacuum force which should be such that it increases the containers weight by approximately five times. If more than three parallel conveyors are used, it should be appreciated that the progressive vacuum strength from infeed to discharge should be maintained.

The preferred blower of the present invention is Dayton blower, Model No. 7H171. This blower is a five horsepower blower that has a 18¼" diameter wheel. The blower may run at a constant speed of 6100 cubic feet per minute at three inches of static pressure. Therefore, when the vacuum combiner of the present invention only uses one blower, and its duct member is placed closer to the discharge end of the combiner, that discharge end will have the greatest vacuum force. The discharge end will have the greatest vacuum force because it is closest to the blower and duct member, and also because the discharge conveyor of the vacuum combiner has the least amount of surface area.

In operation, blower 120 is continually pulling air through air flow openings 27, 38, and 48 which are part of conveyor surfaces 30, 32, and 34, to create a vacuum force on containers 28. As a light-weight container 28, which is on infeed conveyor surface 30, passes over the portion of the infeed conveyor surface 30 that comprises a portion of the plenum top, the light-weight container will be "weighted" or pulled down by the air being sucked through air flow opening 26 by vacuum source 120. Because the blower 120 and duct member 110 is positioned nearer to the discharge conveyor surface 34, and because the width of the container pathway 80 is greatest at the light-weight container's 28 point of entry, the amount of drag on the light-weight container is lowest at this point. As infeed conveyor surface 30 continues to convey the light-weight containers 28 down-line, the light-weight containers will be urged onto the parallel intermediate conveyor surface 32 by rail assembly 60 and also by the greater drag force that is created by the flow of air through air flow openings 38. The drag force that is created by the flow of air through air flow openings 38 is greater than the amount of drag force created by the flow of air through air flow openings 27 on infeed conveyor surface 30 because the width of the container pathway 80 is narrowing, and also because the intermediate conveyor surface 32 is closer to blower 120 and duct member 110 than is infeed conveyor surface 30.

As intermediate conveyor surface 32 continues to convey the light-weight containers 28 down-line, the width of the container pathway 80 continues to narrow at at least a three degree angle, which is determined by the distance between rail assemblies 60 and 62. Light-weight containers 28 will eventually be urged by rail assembly 60 onto discharge conveyor surface 34. Discharge conveyor surface 34 has the greatest amount of drag force being pulled through its air flow openings 48 because discharge conveyor surface 34 has the narrowest container pathway 80 and it is closest to duct member 110, which is the point at which plenum bottom 52 attaches to duct member 110 and blower 120. Because the amount of drag force created by the flow of air through air flow openings 48 on conveyor surface 34 is greater than the drag force that is applied to containers 28 when containers 28 are on intermediate conveyor surface 32, the light-weight containers 28 will be pulled from intermediate conveyor surface 32 onto discharge conveyor 34. The amount of drag force that is applied to the light-weight containers 28 that are on discharge conveyor surface 34 has the effect of increasing the light-weight containers weight by approximately 500%.

As shown in FIG. 2A, while light-weight containers 28 are on discharge conveyor surface 34, the width of container pathway 80 quickly narrows to a width that should be only slightly greater than the diameter of the light-weight containers 28 that are being conveyed. Because the light-weight containers 28 are now in single file, the light-weight containers 28 may be fed directly into an appropriate apparatus for further processing.

Although the invention has been described as merging a multiple width arrangement of containers into a single row of containers, it will be understood that the term "containers" is used to describe duplicate articles of manufacture and should not be limited to just cans or bottles. It will also be understood that this invention is particularly suited for irregularly shaped container bottoms upon which it is normally difficult to form a vacuum seal.

The heretofore unachieved light-weight container combiner speeds of the present invention are illustrated by the following examples which are not intended to be limiting.

EXAMPLES

The following data was obtained using the preferred embodiment of the present invention. More specifically, the rods housed in the guide rails were slanted forward as described above; one vacuum source was applied as depicted in FIG. 2A; and the discharge conveyor was operated at the greatest velocity. As a control, the light-weight containers were combined without vacuum.

| Light-weight Container | BPM Without Vacuum | BPM With Vacuum |
| --- | --- | --- |
| 1. 12 oz. Plastic bottle | 600 | 1200 |
| 2. 20 oz. Plastic bottle | 700 | 1000 |
| 3. 1 Liter Plastic bottle | 500 | 800 |

Although the foregoing data illustrates examples of heretofore unachieved combiner rates for the above-listed containers, it will be obvious that other light-weight containers, as described herein, can also be combined at heretofore unknown rates.

In addition, although the foregoing invention has been described by way of illustration and example for purposes of clarity and understanding, it will be apparent to those skilled in the art that numerous changes or modifications may be made thereto without departure from the spirit and scope of the invention as claimed hereinafter.

What is claimed is:

1. A process for merging a randomly arranged multiple width mass of containers to a narrower stream of the containers as the containers are moved along a processing path comprising the steps of:
   operating at least two laterally adjacent and parallel surface conveyors at progressively greater effective surface speeds;
   delivering the containers in a randomly arranged mass to an upstream end of a slower operating conveyor surface;
   guiding the containers through a progressively constricted path laterally across the surface conveyors progressively from the slower operating conveyors to the faster operating conveyor;
   applying a substantially uniform level of vacuum across the width of each conveyor surface with the level of vacuum increased from the slower operating conveyor to the faster operating conveyor from beneath the surface conveyors to the containers moving on the surface conveyors as the containers are guided laterally across the surface conveyors;
   so that the faster operating conveyor with the greater amount of vacuum therebeneath tends to pull the containers off the slower operating conveyor with the lessor amount of vacuum therebeneath onto the faster operating conveyor.

2. The process of claim 1, wherein said containers are guided by a guide rail that is sloped over the conveyor surfaces for engaging the upper surfaces of the containers.

3. The process of claim 1, wherein said containers are guided by a pair of guide rails that converge towards one another across the conveyor surfaces.

4. The process of claim 1, wherein said containers are guided by a guide rail comprising an air jet means that propels said containers downstream on said conveyor surfaces.

5. The process of claim 1, wherein said containers are guided by a guide rail comprising a plurality of rollers rotatably mounted on rods.

6. An apparatus for merging a randomly arranged multiple width mass of containers to a narrower stream of the containers as the containers are moved along a processing path comprising:
   an operating means for operating at least two laterally adjacent and parallel surface conveyors at progressively greater effective surface speeds;
   a delivering means for delivering the containers in a randomly arranged mass to an upstream end of a slower operating conveyor surface;
   a guide means for guiding the containers through a progressively constricted path laterally across the surface conveyors progressively from the slower operating conveyors to the faster operating conveyor;
   a pressure means for applying a substantially uniform level of vacuum across the width of each conveyor surface with the level of vacuum increased from the slower operating conveyor to the faster operating conveyor from beneath the surface conveyors to the containers moving on the surface conveyors as the containers are guided laterally across the surface conveyors;
   such that the faster operating conveyor with the grater amount of vacuum therebeneath tends to pull the containers off the slower operating conveyor with the lesser amount of vacuum therebeneath onto the faster operating conveyor.

7. The process of claim 6, wherein said containers are guided by a guide rail that is sloped over the conveyor surfaces for engaging the upper surfaces of the containers.

8. The process of claim 6, wherein said containers are guided by a pair of guide rails that converge towards one another across the conveyor surfaces.

9. The process of claim 6, wherein said containers are guided by a guide rail comprising an air jet means that propels said containers downstream on said conveyor surfaces.

10. The process of claim 6, wherein said containers are guided by a guide rail comprising a plurality of rollers rotatably mounted on rods.

11. An apparatus for merging a randomly arranged multiple width mass of containers to a narrower stream of the containers as the containers are moved along a processing path comprising:
   an operating means for operating at least two laterally adjacent parallel surface conveyors at progressively greater effective surface speeds;
   a delivering means for delivering the containers in a randomly arranged mass to an upstream end of a slower operating conveyor surface; and
   a guide means sloped over said conveyor surfaces for engaging the upper surfaces of said containers and for guiding the containers through a progressively constricted path laterally across the surface conveyors progressively form the slower operating conveyors to the faster operating conveyor.

12. The process of claim 11, wherein guide means further comprises an air jet means that propels said containers downstream on said conveyor surfaces.

13. The apparatus of claim 11, further comprising a pressure means for applying a zone of uniform vacuum to each conveyor with the level of vacuum increased from the slower operating conveyor to the faster operating conveyor form beneath the surface conveyors to the containers moving on the surface conveyors as the containers are guided laterally across the surface conveyors; such that the faster operating conveyor with the greater amount of vacuum therebeneath tends to pull the containers off the slower operating conveyor with the lesser amount of vacuum therebeneath onto the faster operating conveyor.

14. The apparatus of claim 11, wherein said guide means comprises a plurality of rollers rotatably mounted on rods.

15. The apparatus of claim 14, wherein said rods are angled in said guide rails.

* * * * *